United States Patent
Schaal

(10) Patent No.: US 6,550,736 B2
(45) Date of Patent: Apr. 22, 2003

(54) DEVICE FOR HOLDING A BEVERAGE CONTAINER IN A MOTOR VEHICLE

(75) Inventor: Falk Schaal, Alpirsbach (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/054,189

(22) Filed: Jan. 22, 2002

(65) Prior Publication Data

US 2002/0096531 A1 Jul. 25, 2002

(30) Foreign Application Priority Data

Jan. 24, 2001 (DE) .......................... 101 03 140

(51) Int. Cl.$^7$ ................................ A47K 1/08
(52) U.S. Cl. ............... 248/311.2; 224/281; 224/926
(58) Field of Search ............ 248/311.2; 224/281, 224/549, 570, 926

(56) References Cited

U.S. PATENT DOCUMENTS

| | | | |
|---|---|---|---|
| 5,259,580 A | * 11/1993 | Anderson et al. | ........... 224/926 |
| 5,845,888 A | 12/1998 | Anderson | |
| 5,944,240 A | * 8/1999 | Honma | ........ 224/281 |
| 6,036,152 A | 3/2000 | Hiscox et al. | |

FOREIGN PATENT DOCUMENTS

| DE | 296 05 953 U1 | 8/1996 |
|---|---|---|
| JP | 2000272401 A | 10/2000 |

* cited by examiner

Primary Examiner—Ramon O. Ramirez
(74) Attorney, Agent, or Firm—Michael J. Striker

(57) ABSTRACT

A holder for a beverage container in a motor vehicle has a plurality of holding elements which are turnable away from one another and in an unfolded position form a holding ring for insertion of a beverage container at an end side of a surface of the holding elements.

7 Claims, 2 Drawing Sheets

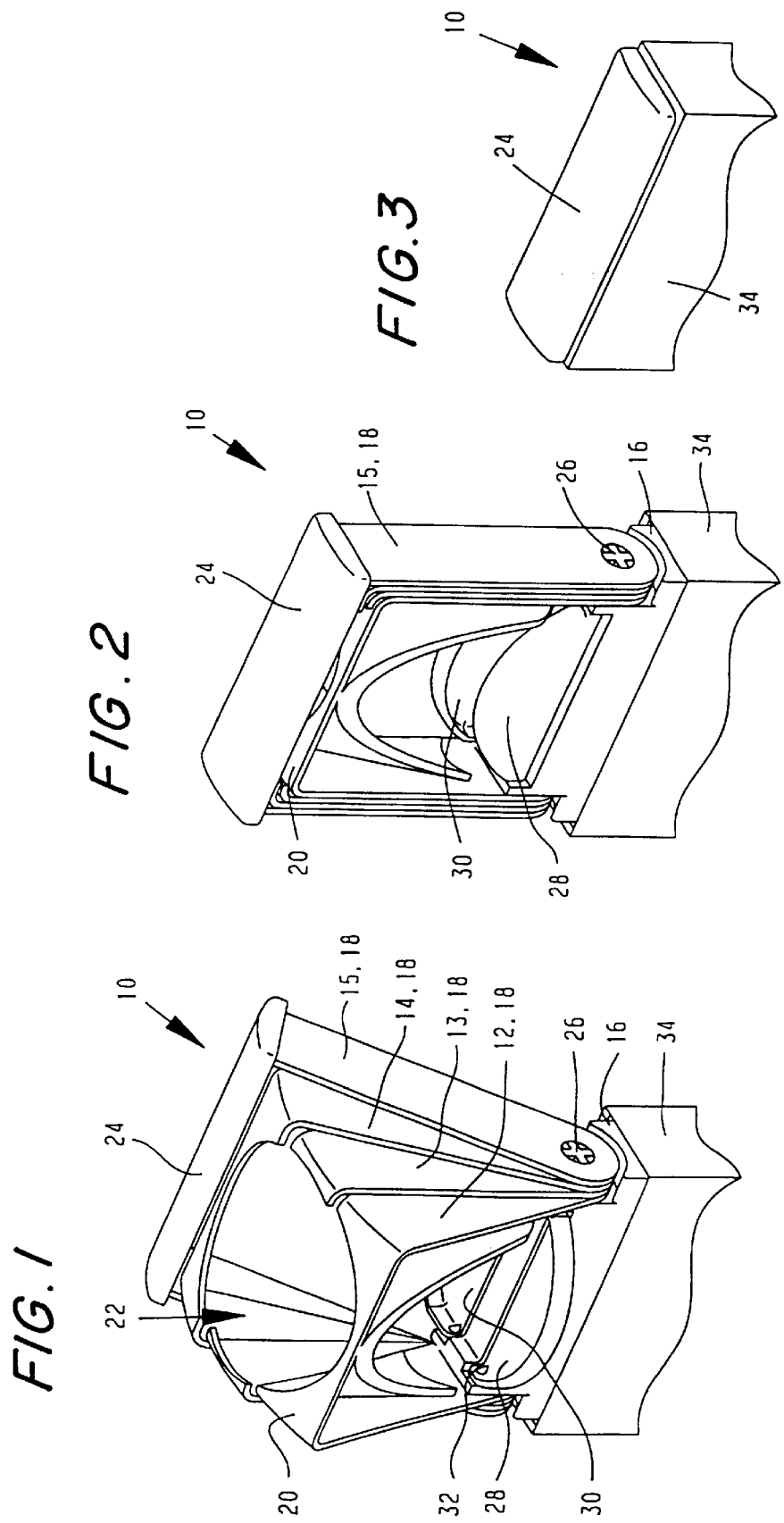

DEVICE FOR HOLDING A BEVERAGE CONTAINER IN A MOTOR VEHICLE

BACKGROUND OF THE INVENTION

The present invention relates to a device for holding a beverage container, for example a bottle in a motor vehicle or a similar moving means.

Numerous holders for holding low beverage containers, such as cans, cups or mugs in a motor vehicle are known. The known holders however has the disadvantage of their low holding height. The term "holding height" is used to mean the height over which the holder can support a beverage container on its periphery. Known holders are not suitable for holding a high beverage container to prevent its tilting, such as for example a bottle and the like.

SUMMARY OF THE INVENTION

It is therefore an object of the present invention to provide a holding device for holding a beverage container, such as a bottle in a motor vehicle which avoids the disadvantages of the prior art.

More particularly, it is an object of present invention to provide a device for holding a bottle in a motor vehicle, which allows to hold a high beverage container, such as for example a bottle, reliably to prevent its tilting.

In keeping with these objects and with others which will become apparent hereinafter, one feature of the present invention resides, briefly stated, in a device for holding a bottle in a motor vehicle and the like, which includes a plurality of turnably supporting holding elements which can be turned from one another around an axis.

In the inventive holder, the sides or legs of the holding elements form corresponding elements. In an unfolded position, the sides or legs of the holding elements form a surface. In the unfolded position the holding elements at the end side which perpendicularly adjoin the compartment at a distance from the end side, that in the unfolded position of the holding elements forms the holding ring.

The inventive holder provides a high holding height, since its holding ring supports the bottle inserted in the holder above its bottom over its periphery. Thereby the inventive holder can hold high beverage containers, for example bottles, in a tilting-preventing manner.

In accordance with one embodiment of the invention, the holding elements are bracket-shaped. They are turnably supported at their legs and form the holding ring in the unfolded position at their end sides.

In accordance with a further embodiment of the present invention, a screen is provided on the end side of one holding element. In the folded position of the holding elements it covers the holding elements.

It is also possible that the holding elements are turnable on different turning axes. However, in a preferable embodiment a common turning axis is provided for the holding elements. The turning axis is arranged at a distance from the end side, that in the unfolded position of the holding elements forms the holding ring.

With the bracket-shaped holding elements, the turning axis is provided in particular at the free ends of the legs of the holding elements. The turning axis extends parallel or substantially parallel to the end side and perpendicular or approximately perpendicular to the surface which is formed by the holding elements in the unfolded position.

In order to lower the holder during the time of non-use, in accordance with one embodiment of the invention the holding elements can be supported turnably on a slider which is displaceable as a drawer.

In accordance with another embodiment of the present invention, an adjusting element is provided, on which the bottle inserted in the holder is located. The adjusting element is turnable in order to accommodate it in a space-saving manner in the position of non-use. The adjusting element can be formed as a single-piece or as a multiple-piece element. It forms preferably a drop shell.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view showing a holder in an unfolded position;

FIG. 2 is a view showing the holder of FIG. 1 in a folded position;

FIG. 3 is a view showing the holder of FIG. 1 in a lowered position;

DESCRIPTION OF THE PREFERRED EMBODIMENTS

Figure 6:
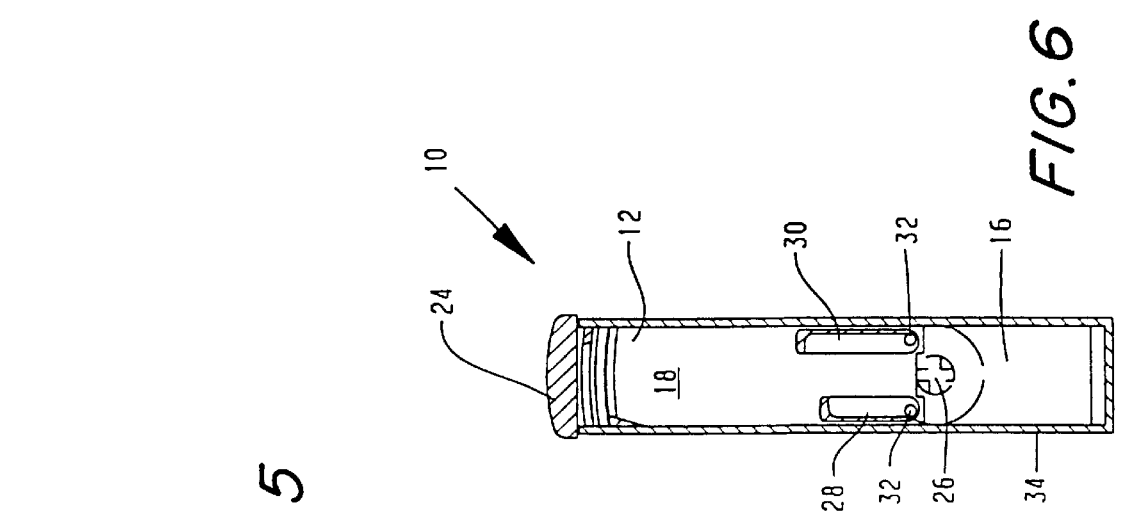
FIG. 6 is a view showing the holder of FIG. 1 in a lowered position in a cross-section.

A holder 10 in accordance with the present invention is shown in FIG. 1. It is mounted in a not shown motor vehicle, for example in its central console. The holder 10 is provided for insertion of a beverage container, for example a bottle.

In the shown and described embodiment the holder 10 has four holding elements 12, 13, 14, 15. As can be seen from FIGS. 1 and 4 they can be turned away from one another around an axis. The holding elements 12–14 are supported in a slider 16. The holding elements 12, 14 and 15 are bracket-shaped. They have two leg walls 18 which are connected with one another at an end side of one piece by a yoke wall 20. One holding element 13 which is arranged between the two other holding elements 12 and 14 has no yoke wall. However, it has two leg walls 18.

Figure 4:
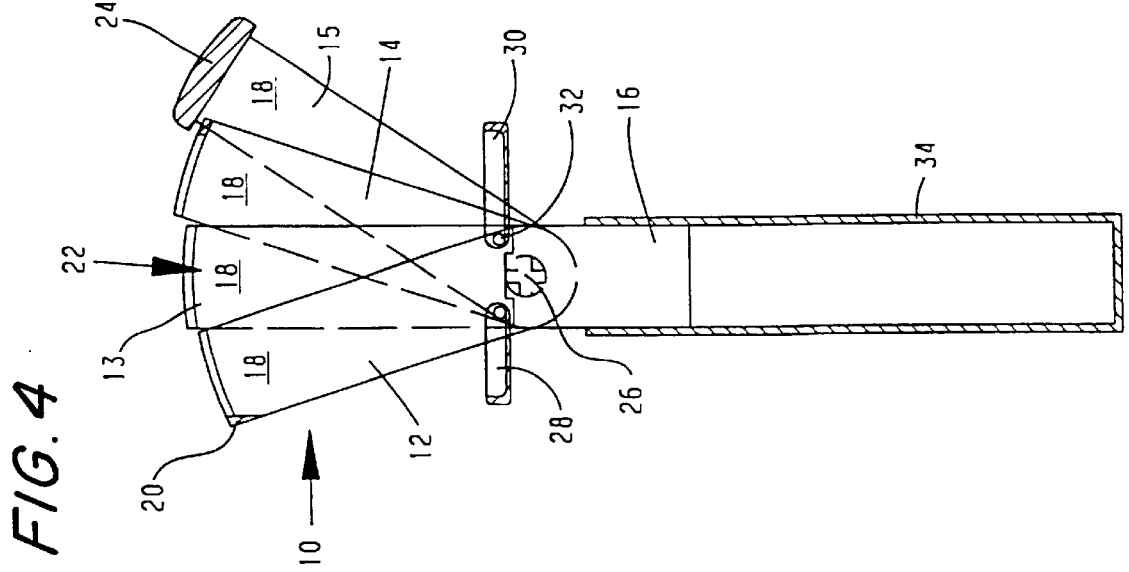
FIG. 4 is the view showing the holder of FIG. 1 in the unfolded position in a cross-section.

The yoke walls 20 of the holding elements 12, 14 which adjoin the holding elements 13 without a yoke wall are cut out in a circular-arc shape, so that the end sides of the three above mentioned holding elements 12, 13, 14 in the unfolded position shown in FIGS. 1 and 4 form a holding ring 22 as can be seen in FIG. 1. A not shown bottle is insertable in the holding ring 22. It is supported by the holding ring 22 over its periphery so that it can not tilt in a lateral direction.

The fourth holding element 15 has no holding function. It carries a screen 24 on its end side. In the folded position of the holder shown in FIGS. 2 and 5 the screen 24 covers all holding elements 12–15 at their end side.

The leg walls 18 of the holding elements 12–15 are turnably supported at their free ends on pins 26. The pins 26 laterally project from the slider 16. The both holding pins 26 define an imaginary common turning axis for the holding elements 12–15, which extends parallel to the end sides provided with the yoke wall 20 and perpendicular to the leg walls 18. The leg walls 18 of the holding elements 12–15 are long and therefore provide a great distance of the holding ring 22 from the turning axis of the holding elements 12–15 defined by the pins 26. Thereby a great holding height for holding a beverage container, for example a bottle, in the holder 12 is provided.

Supporting surfaces 28, 30 are provided substantially at the height of the pin 26 of the slider 16 for supporting a bottle inserted in the holder 10. The supporting surfaces 28, 30 are formed as two substantially semi-circular adjusting elements, which are supported turnably around the pins 32 on the slider 16. Together with the slider 16 the semicircular supporting elements 28, 30 form a drop shell.

In the unfolded position the leg walls 18 of the holding elements 12–15 form a kind of a surface. The turning axis of the holding elements 12–13 which is defined by the pins 26 extends perpendicular to the surface formed by the leg walls 18.

Figure 5:
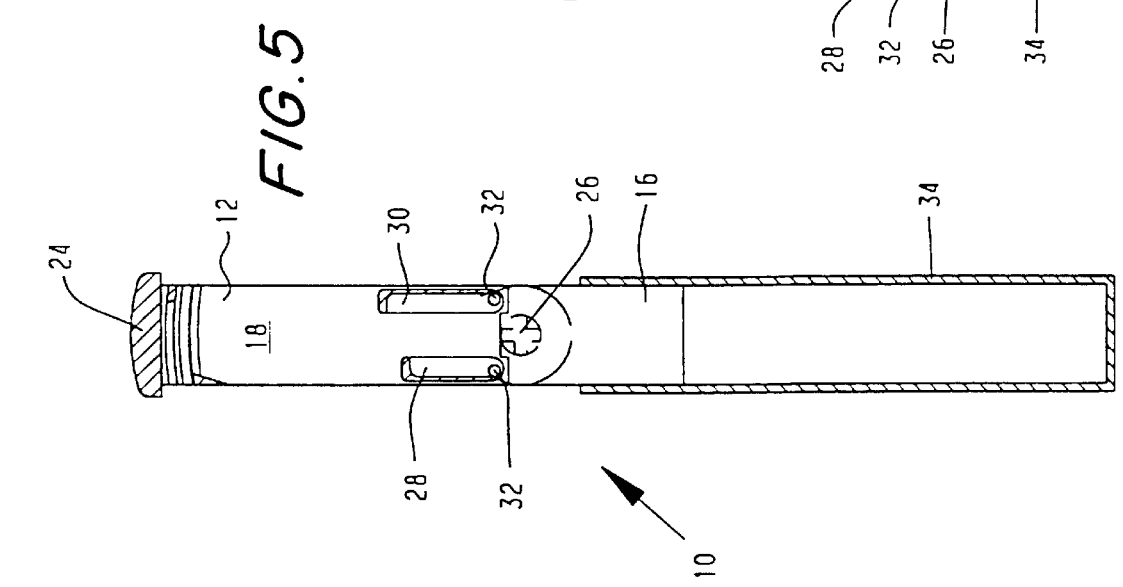
FIG. 5 is a view showing the holder of FIG. 1 in a folded position, in a cross-section.

The slider 16 is displaceble in a housing 34 of the holder 10 as a drawer. The housing 34 is shaft-shaped and is open at an end side. In the position of non-use the holding elements 12–15, as shown in FIGS. 2 and 5, can be turned into one another to a folded position and to together with the slider 16 introduced or lowered into the housing 34. The lowered position shown in FIGS. 3 and 4. In the lower position the screen 24 closes the housing 34 of the holder 10. During lowering the supporting elements 28, 30 which form the supporting surface and the drop shell shown in FIGS. 2, 5, and 6 are turned upwardly between the holding elements 12–15.

The displacement of the holder 10 from the housing 34 outwardly can be performed in a simple manner with a spring element shown in the drawings. It is supported in the housing 34 and displaces the slider 16 to a position in which it projects outwardly beyond the upper side of the housing 34, as shown in FIGS. 1, 2, 4, 5. In the lowered position the slider 10 is held by a not shown, known locking device (heart curve lock or push-push mechanical lock), which is unlockable by a quick push on the screen 24 of the lowered holder 10. Since such locking devices and spring elements for displacement of the sliders 16 for holding beverage containers are known and are not germane to the present invention, they are not shown in the drawings to simplify the illustration of the present invention.

It will be understood that each of the elements described above, or two or more together, may also find a useful application in other types of constructions differing from the types described above.

While the invention has been illustrated and described as embodied in device for holding a bottle in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holder for a beverage container in a motor vehicle, comprising a plurality of holding elements, said holding elements being turnable away from one another and in an unfolded position forming a holding ring for insertion of a beverage container at an end side of a surface of said holding elements; and a turnable adjusting element which forms a supporting surface for a beverage container inserted in said holding ring.

2. A holder as defined in claim 1, wherein said holding elements are formed as bracket-shaped holding elements.

3. A holder as defined in claim 1; and further comprising a screen which is provided at an end side of one of said holding elements and formed so that in a folded position of said holding elements said screen covers said holding elements.

4. A holder as defined in claim 1, wherein said holding elements are turnable around a joint turning axis, said joint turning axis being arranged at a distance from said end sides of said holding elements and extending substantially parallel to said end side and substantially perpendicular to said surface.

5. A holder as defined in claim 1; and further comprising a slider which is displaceable as a drawer; said holding elements being turnably supported in said slider.

6. A holder as defined in claim 1, wherein said adjusting element is composed of two parts.

7. A holder as defined in claim 1, wherein said adjusting element forms a drop shell.

* * * * *